(12) United States Patent
Kawasaki et al.

(10) Patent No.: US 7,136,201 B2
(45) Date of Patent: Nov. 14, 2006

(54) ORIGINAL PRESSING APPARATUS AND ITS APPLICATION

(75) Inventors: Shigeru Kawasaki, Kanagawa (JP); Tsuyoshi Yamauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 10/077,638

(22) Filed: Feb. 15, 2002

(65) Prior Publication Data

US 2002/0126325 A1   Sep. 12, 2002

(30) Foreign Application Priority Data

Feb. 21, 2001  (JP)  ............................. 2001-044972
Aug. 10, 2001  (JP)  ............................. 2001-244600

(51) Int. Cl.
*H04N 1/04*   (2006.01)
*H04N 1/00*   (2006.01)
*G03G 15/00*  (2006.01)

(52) U.S. Cl. ...................... 358/474; 358/497; 358/401; 399/380

(58) Field of Classification Search ................ 358/474, 358/497, 401; 399/379, 380, 362; 355/75, 355/25

See application file for complete search history.

(56) References Cited

U.S. PATENT DOCUMENTS 6,233,426 B1 *   5/2001   Lee et al. ................... 399/380
6,456,365 B1 *   9/2002   Hosaka et al. ................ 355/75
6,593,999 B1 *   7/2003   Hosaka ........................ 355/75

* cited by examiner

*Primary Examiner*—Jerome Grant
*Assistant Examiner*—Houshang Safaipour
(74) *Attorney, Agent, or Firm*—Morgan & Finnegan, LLP

(57) ABSTRACT

An original pressing apparatus applicable to, e.g., an original reading apparatus having: an original pressing plate; a hinge unit having a first end supported rotatably with respect to the original pressing plate and a second end rotatably supported by an external device; and a press-fixing unit adapted to prevent rotation between said hinge unit and said original pressing plate by pressing the original pressing plate and the hinge unit into contact in a rotation axial direction, wherein the press-fixing unit is capable of releasing a press-contact state.

12 Claims, 13 Drawing Sheets

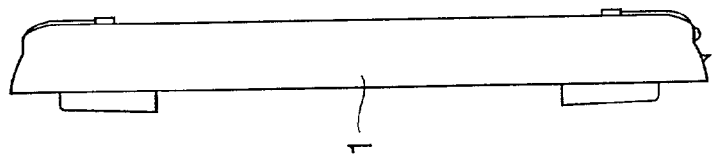
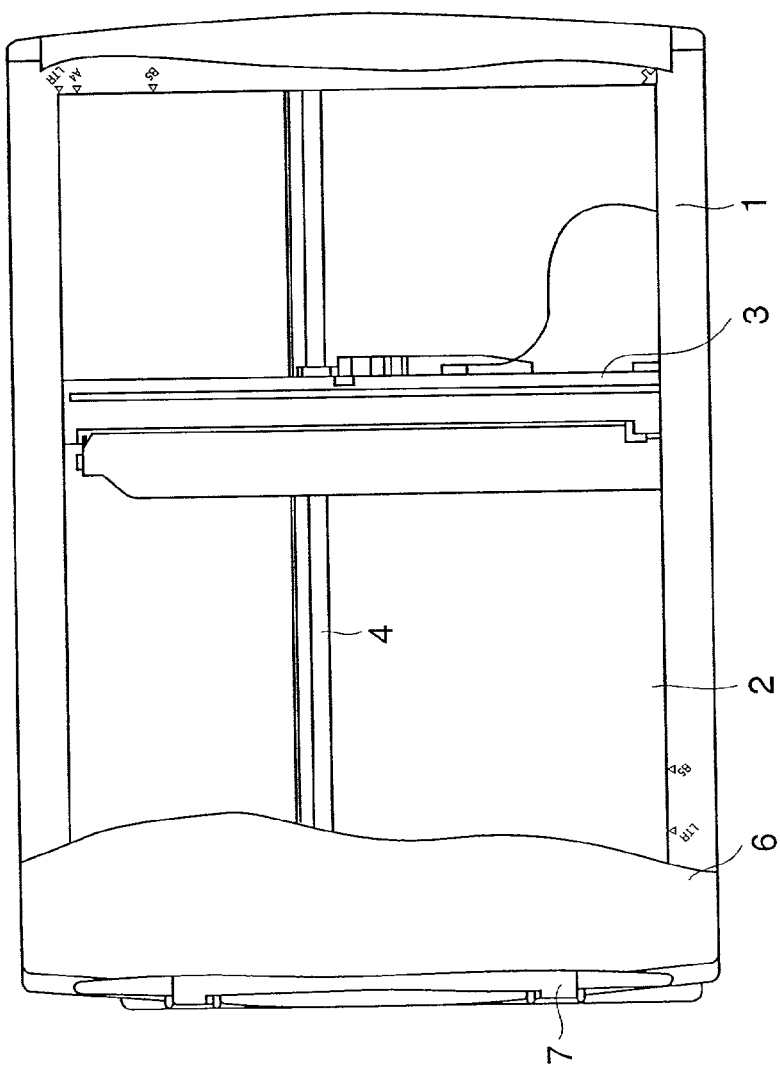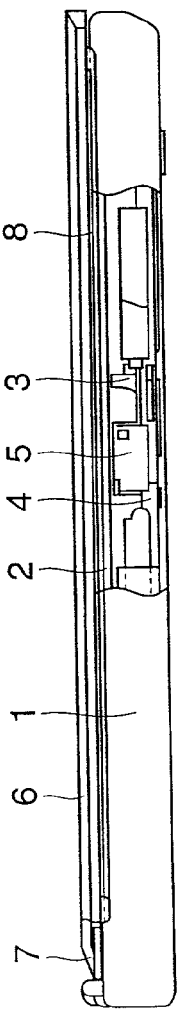

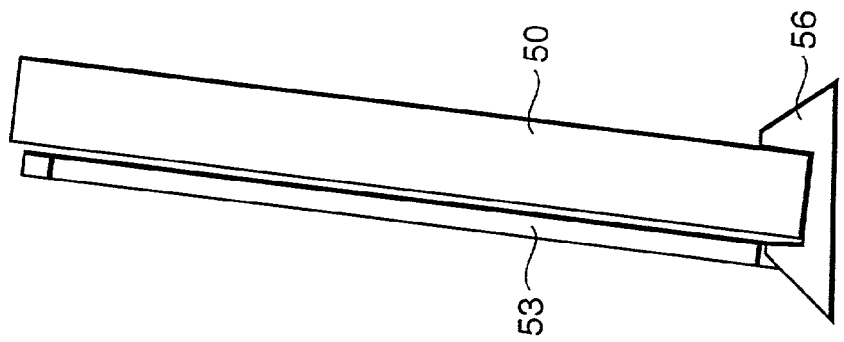
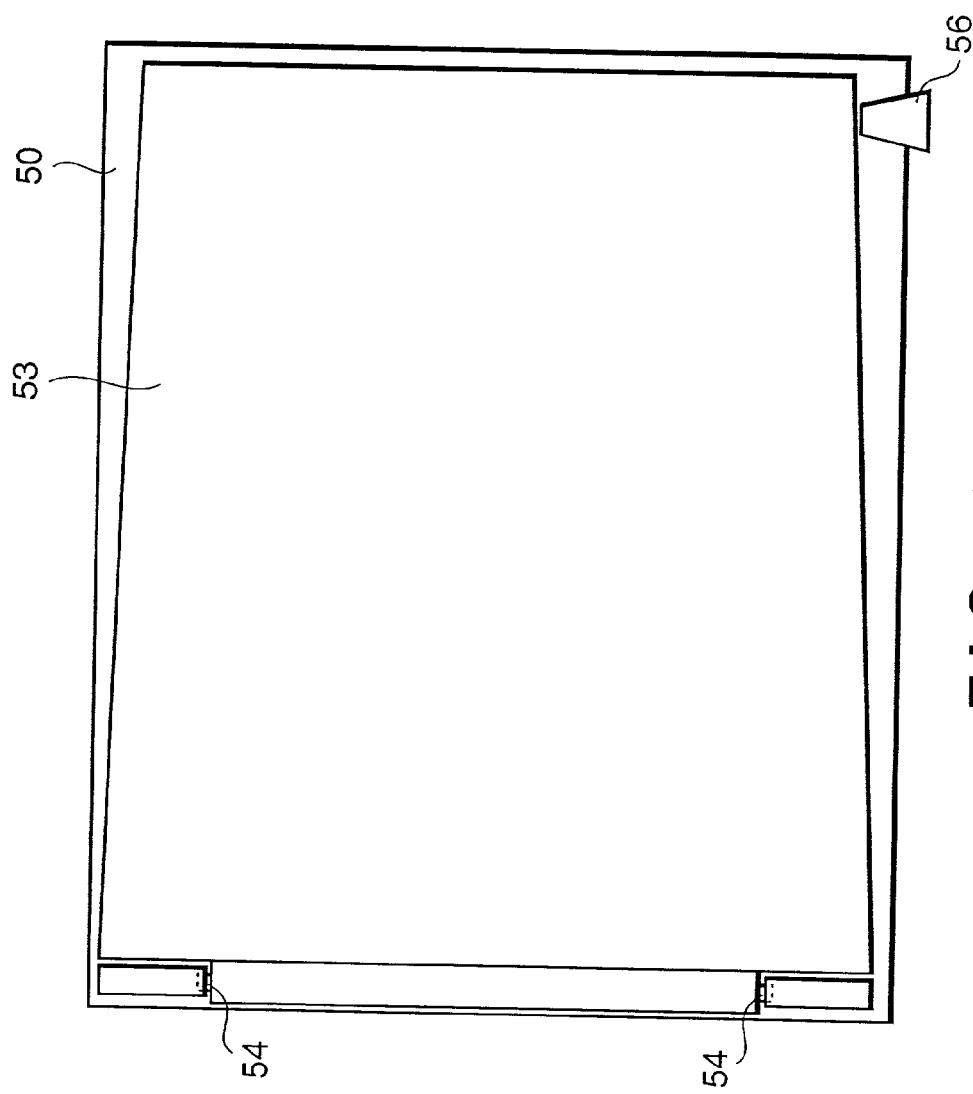

ORIGINAL PRESSING APPARATUS AND ITS APPLICATION

FIELD OF THE INVENTION

The present invention relates to an image reading apparatus which reads an original such as a photograph and a document and outputs image data, and more particularly, to an image reading apparatus which performs reading even if a thick original is set or if the apparatus is set on its side while securely fixing the original.

BACKGROUND OF THE INVENTION

In recent years, image reading apparatuses including a scanner are widely used with widespread use of personal computers. Among these apparatuses, a flatbed image reading apparatus has an advantage that it can read a thick original such as a book.

FIG. 11 is a cross-sectional view schematically showing the structure of a conventional flatbed image reading apparatus. In the image reading apparatus in FIG. 11, an original is placed face down on a platen glass 51 provided on an upper surface of apparatus main body 50. A contact image sensor 52 provided in the apparatus main body 50 scans the original while it is moved along the surface of the original, thus optically reads the image of the original.

In the image reading apparatus, a document cover 53 as an original pressing member is openably/closably attached to the apparatus main body 50 such that the original is brought into intimate contact with the platen glass 51.

The document cover 53 is rotatably attached to the apparatus main body by a hinge 54 provided at a rear end of the apparatus. A document press-fixing member 55 such as a sponge is attached to the platen glass side.

The original is placed on the platen glass 51 and the document cover 53 is closed, thereby the original is pressed against the platen glass 51 and is fixed on the platen glass 51.

The above-described conventional flatbed image reading apparatus requires space for placement equal to or greater than the size of the original. If the apparatus is designed to read a large-sized original, it requires large space for placement of the apparatus.

However, as the contact image sensor for image reading is very small and light-weighted, and the height of the apparatus main body 50 is not so great, the apparatus main body 50 may be set upright with its side down using a stand 56 as an accessory tool, as shown in FIGS. 12A and 12B.

The original which can be scanned in the upright state is limited to a sheet type original. If the apparatus is arranged such that the document cover 53 and the end of the apparatus main body 50 are brought into contact with each other by a suction cup or the like, the original can be scanned while it is pressed against the platen glass 51.

On the other hand, the document cover 53 in the conventional structure opens/closes by rotation on the hinge 54 as a rotational axis in the rear end, however, the document cover 53 cannot press a thick original such as a book in this structure. Generally, the hinge 54 is configured slidable in upward and downward directions when the apparatus main body 50 is placed in level, and the document cover 53 floats from the platen glass, so that the document cover 53 can press the thick original against the platen glass.

However, in the image reading apparatus which can be set upright, if the hinge 54 in the horizontal position is upward/downward slidable, the hinge 54 slides when the apparatus is set upright, the document cover 53 floats from the platen glass 51 and cannot press the original properly. Accordingly, the slide hinge cannot be employed, and the thick original cannot be scanned by this structure.

Further, FIG. 13 shows a two-step hinge type structure as another example where two hinge members A and B are provided between the document cover and the apparatus main body, and the hinge member B has an additional function of restoring the positional relation between the document cover and the apparatus main body so as to open the document cover. In this structure, the document cover does not open when the apparatus is set upright. Further, when the apparatus is set in level, a thick original can be pressed against the platen glass in a stable manner.

However, in the two-step hinge type image reading apparatus, especially when it is set upright, the constant positional relation cannot be properly maintained between the document cover and the platen glass when the document cover is closed, due to backlash of the rotational axis between the document cover and the hinge member in the axial direction.

Further, when the document cover of this two-step hinge type structure for a thick original is closed from an opened state, as the barycenter of the document cover is higher than the rotation axes of the two hinges, the rotational axis of the hinge A, not the rotational axis of the hinge B, becomes the rotational axis of the document cover. Especially, as shown in FIG. 13, if the rotational axis of the hinge B is out of a straight line passing through the barycenter of the document cover and the hinge A, there is torque to open the document cover about the hinge B when the document cover is open. Accordingly, the hinge B does not follow the movement of the document cover to close but it buckles as shown in FIG. 13. As a result, a user feels insecure about opening/closing operations, and further, if the end of the document cover is brought into contact with the original, the original may be damaged.

Further, when the apparatus is set upright, the opening/closing operations of the document cover are unstable due to a similar reason. Further, as the document cover is closed in a buckled state, a sufficient pressing force cannot be obtained to press the original against the platen glass. Accordingly, the original may float from the platen glass, and the quality of read image may be degraded.

SUMMARY OF THE INVENTION

The present invention has been made in consideration of the above situation, and has its object to provide an original pressing apparatus which securely fixes an original with a simple structure regardless of setting orientation of the apparatus and thickness of the original.

According to the present invention, the foregoing object is attained by providing an original pressing apparatus comprising: an original pressing plate; a hinge unit having a first end supported rotatably with respect to the original pressing plate and a second end rotatably supported by an external device; and a press-fixing unit adapted to prevent rotation between the hinge unit and the original pressing plate by pressing the original pressing plate and the hinge unit into contact in a rotation axial direction, wherein the press-fixing unit is capable of releasing a press-contact state.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A to 1C are a partially-cutaway top view, a partially-cutaway side view and a side view of an image reading apparatus according to a first embodiment of the present invention;

FIGS. 12A and 12B are side views showing the conventional image reading apparatus set upright.

DETAILED DESCRIPTION OF THE PREFERRED EMBODIMENTS

Preferred embodiments of the present invention will be described in detail in accordance with the accompanying drawings. In the embodiments, an original pressing apparatus of the present invention is applied to an image reading apparatus. Further, sizes, materials, shapes of constituent elements and relative arrangement thereof, unless particularly described, do not pose any limitation on the scope of the invention.

<First Embodiment>

A first embodiment of the present invention will be described with reference to FIGS. 1 to 6.

(Entire Structure)

Figure 2:
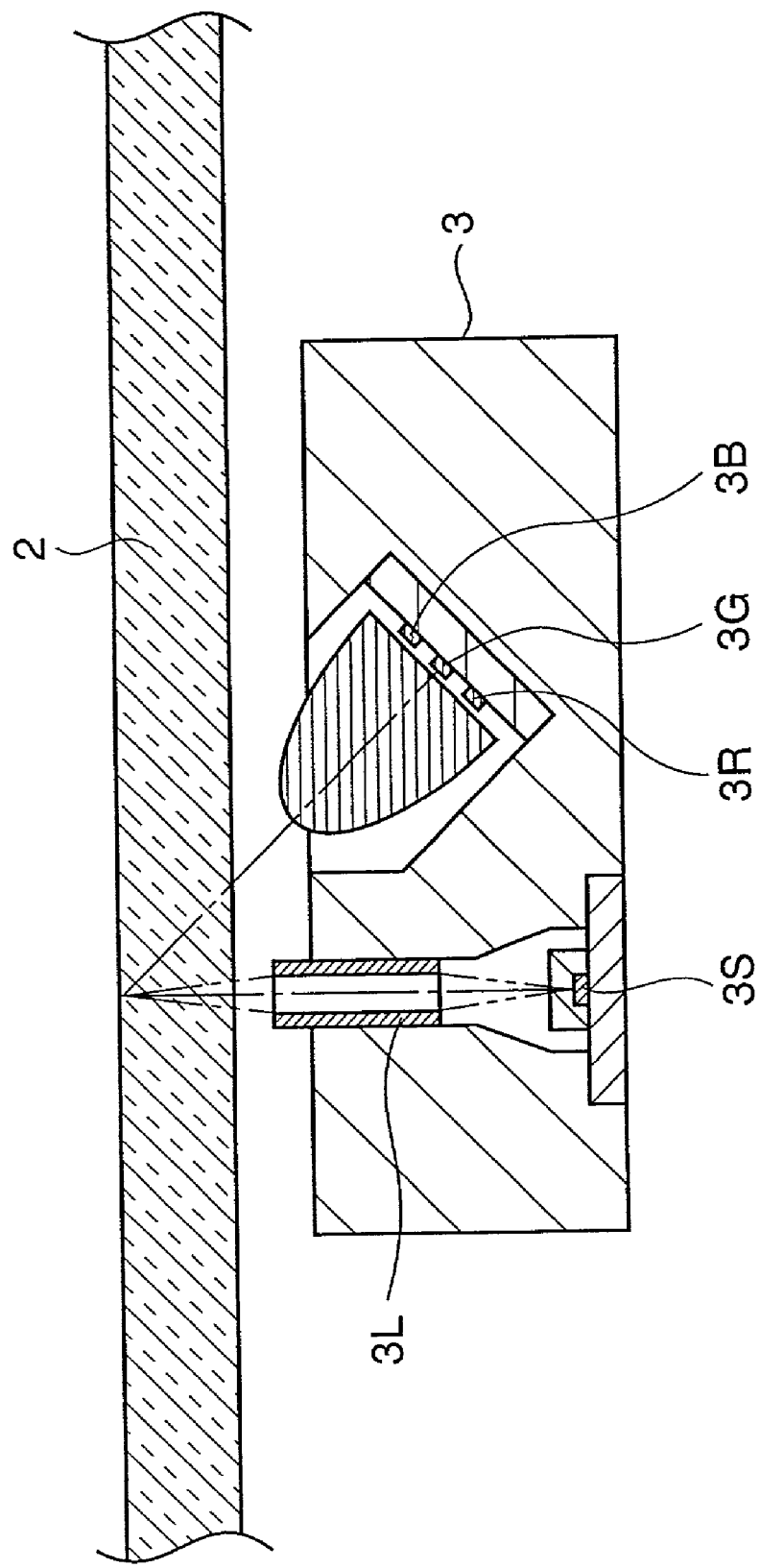
FIG. 2 is a cross-sectional view schematically showing the structure of a contact image sensor according to the first embodiment of the present invention.

First, the entire structure of the image reading apparatus according to the present embodiment will be described with reference to FIGS. 1A to 1C, FIG. 2 and FIG. 3. FIGS. 1A to 1C are schematic diagrams showing the structure of the image reading apparatus. FIG. 1A is a partially-cutaway top view, FIG. 1B is a partially-cutaway side view, and FIG. 1C is a side view. FIG. 2 is a cross-sectional view schematically showing the structure of a contact image sensor.

As shown in FIGS. 1A and 1B, an original is set on a platen glass 2 provided on an upper surface of an apparatus main body 1, and a contact image sensor 3 in the apparatus main body 1 is scan-moved in parallel with the platen glass 2, thereby an image of the original is read.

Note that as shown in FIG. 2, the contact image sensor 3 has a three-color LEDs 3R, 3G and 3B as original illuminating light sources, an image sensor array 3S, and a rod lens array 3L which forms an image from reflected light from the original on photoreception devices of the image sensor array 3S. The contact image sensor 3 sequentially turns on the three-color LEDs 3R, 3G and 3B, while the image sensor 3S reads reflected light from the original by each color, thereby performing color-separation reading.

As shown in FIG. 1B, the contact image sensor 3 is stably held on a slider 5 which slides on a guide shaft 4 fixed to the apparatus main body 1. Further, a belt (not shown) to transmit power from a motor (not shown) as a scanning drive source is engaged to the slider 5. The contact image sensor 3 is capable of reciprocating-scanning within the range of the platen glass 2 by forward/reverse rotation of the motor.

The image reading apparatus further has an electrical component including a control board and a power source as well as the above constituent elements. These constituent elements are provided in the apparatus main body 1 which fixedly holds the platen glass 2.

Further, a document cover 6 as an original pressing member to press the original against the platen glass 2 is attached over the platen glass 2, openably/closably with respect to the apparatus main body 1 via a hinge member 7.

A document press-fixing sheet 8 comprising a sheet material and a sponge is attached to a surface of the document cover 6 on the side facing to the platen glass 2.

Figure 3:
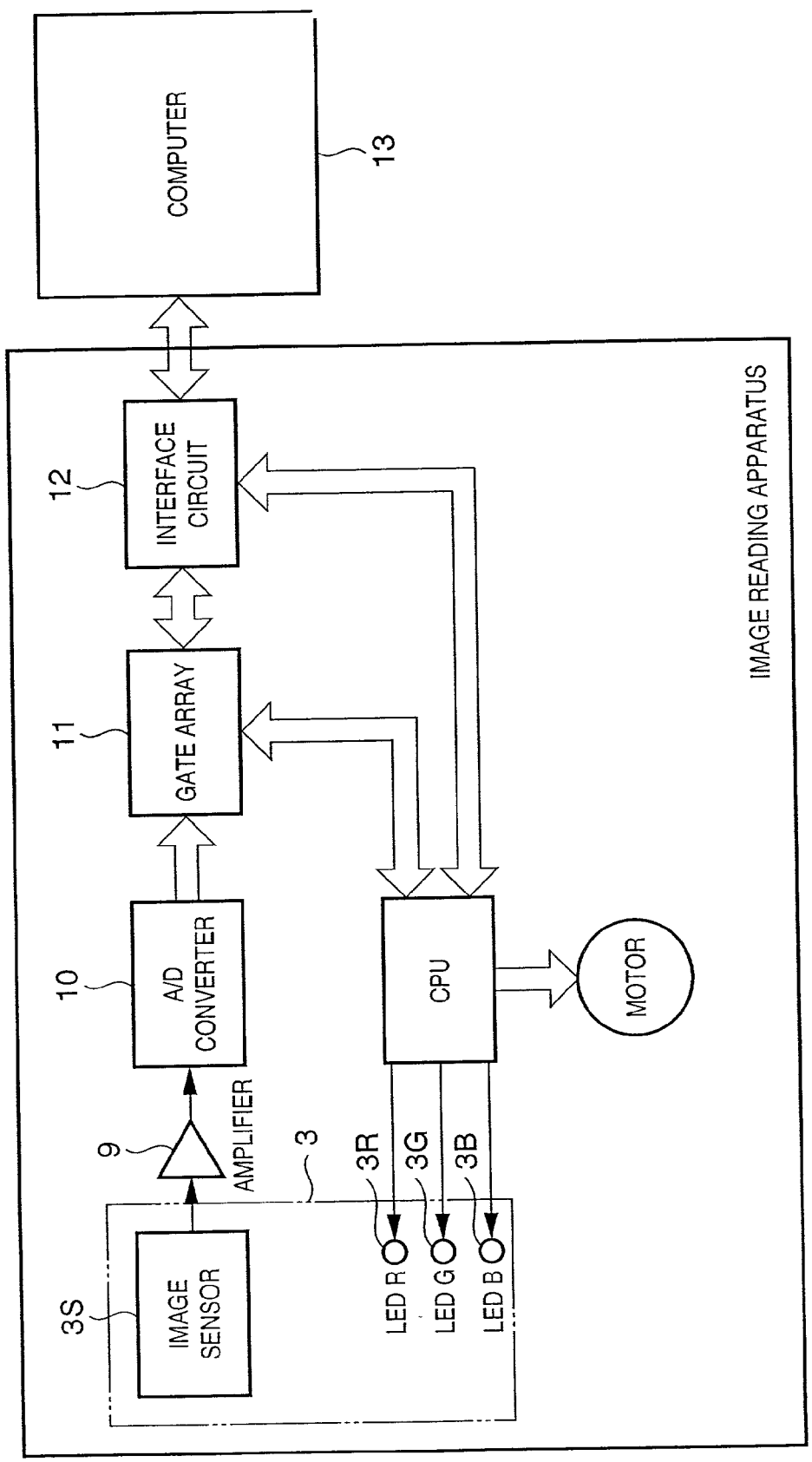
FIG. 3 is a block diagram showing a construction for processing read image data in the image reading apparatus according to the first embodiment of the present invention.

Next, data processing on a read image in the image reading apparatus will be described. FIG. 3 is a block diagram showing a construction for processing read image data in the image reading apparatus.

An image output signal, obtained by reading light reflected from an original by the image sensor array 3S in synchronization with the sequential turn-on operation of the LEDs 3R, 3G and 3B, is amplified by an amplifier 9, and converted into a digital image signal by an A/D converter 10.

The A/D converter 10 divides a dynamic range (an output difference between a white and black portions of the original) of the image sensor array 3S by the number of bits, and allocates grayscale levels in correspondence with brightness of the image on the original.

For example, in a case where the A/D converter 10 has an 8-bit resolution, the brightness from white to black is discriminated in 256 grayscale levels. In a case where the A/D converter 10 has a 10-bit resolution, the image is discriminated in 1024 grayscale levels.

Accordingly, in color reading by the RGB three color light sources, in a case where the image reading apparatus uses the 8-bit resolution A/D converter 10, about 16,700,000 colors can be discriminated by 24 bits, while in a case where the image reading apparatus uses the 10-bit resolution A/D converter 10, about 1,074,000,000 colors can be discriminated by 30 bits.

The image reading apparatus can output image signals in plural types of output formats. An appropriate output format is selected in correspondence with the utilization purpose of read image. If a document is read and the content is subjected to optical character recognition, or a monochromatic drawing is read, monochrome binary image data is appropriate. Among the above-described RGB light sources, only G light, for example, is turned on, and the obtained image signal is binarized by an image processing circuit in the gate array 11 based on a predetermined threshold value.

If an image such as a photograph is read for the purpose of outputting image data to a monochrome printer, an image signal similarly obtained by using e.g. the G light source is binarized by using a halftone processing such as a dither method or an error diffusion method. Further, if a color image is processed, multivalue (24-bit, etc.) image data is appropriate.

The image signal from the image processing circuit in the gate array 11 is outputted via an interface circuit 12 to a computer 13 or the like.

(Hinge Structure)

Figure 4A:
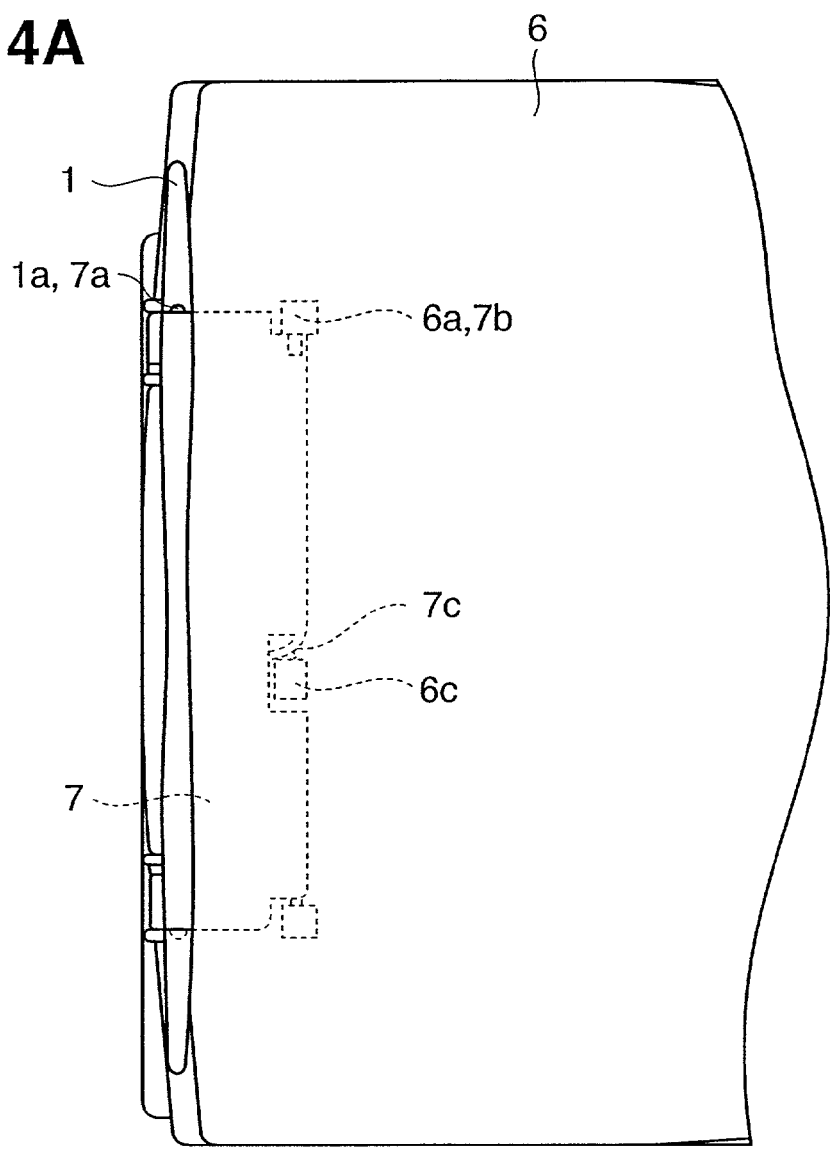
FIG. 4A is a partial top view of an image reading apparatus main body according to the first embodiment of the present invention.
Figure 4B:
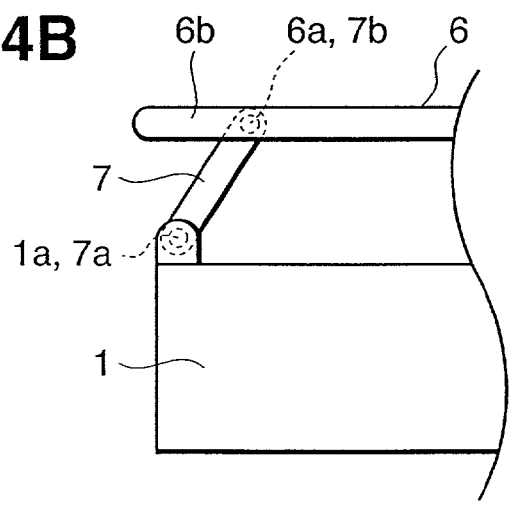
FIG. 4B is a partial side view of a hinge structure connecting a document cover with the apparatus main body according to the first embodiment of the present invention.

Next, an opening/closing structure of the document cover 6 to the apparatus main body 1 will be described. FIGS. 4A and 4B are diagrams explaining a hinge structure openably/closably connecting the apparatus main body 1 with the document cover 6. FIG. 4A is a partial top view of the image reading apparatus, and FIG. 4B is a partial side view of the apparatus. These figures both show a portion related to the hinge structure in a perspective manner.

As shown in FIGS. 4A and 4B, the document cover 6 and the hinge member 7 to press an original against the platen glass 2 are rotatably supported about an axis passing through engagement portions between concave portions 1a provided at a rear end of the apparatus main body 1 and convex portions 7a provided at a rear end of the hinge member 7 and an axis passing through engagement portions between convex portions 7b provided at a front end of the hinge member 7 and concave portions 6a at a rear end of the document cover 6 on the platen glass 2. In this manner, the document cover 6 is attached openably/closably with respect to the apparatus main body 1.

Figure 5:
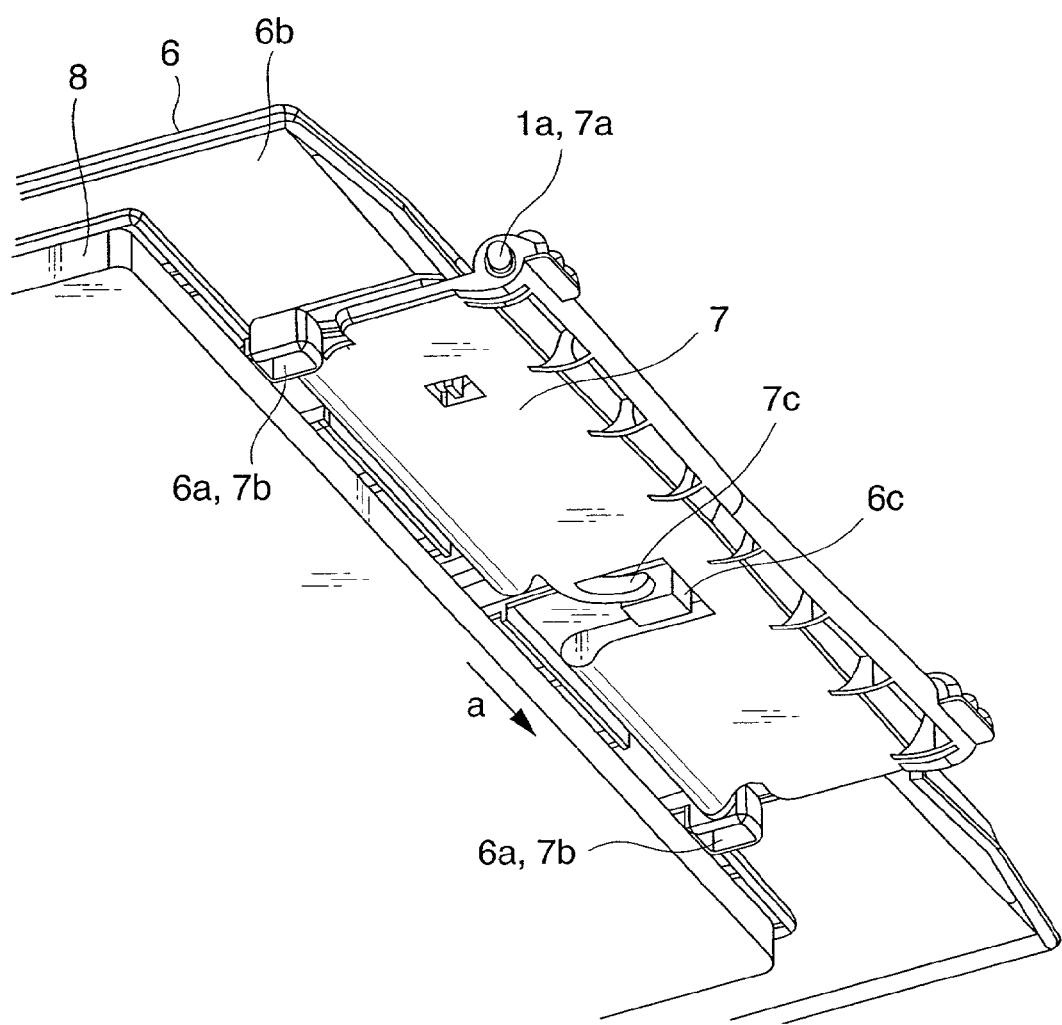
FIG. 5 is a partial perspective view of a connecting portion between the document cover and a hinge member according to the first embodiment.

Further, FIG. 5 is a perspective view of the document cover 6 and the hinge member 7 viewed from the platen glass 2 side. As shown in FIG. 5, the rear end of the document cover 6 is provided with an overhang member 6b as a limitation member projecting toward an area further rear of the engagement portion of the concave portion 6a and the convex portion 7b as the rotational axis between the document cover 6 and the hinge member 7 (an area on the other side of that of the engagement portion to press the original with respect to the engagement portion). The overhang member 6b comes into contact with the hinge member 7, thereby the document cover 6 is not opened wider than a predetermined angle with respect to the hinge member. Thus the rotational range of the document cover 6 to the hinge member 7 is limited.

Further, the hinge member 7 is provided with a biasing member 7c, having elasticity, integrally formed with the hinge member 7. An end of the biasing member 7c is in contact with a receive member 6c formed on the document cover 6. The biasing member 7c and the receive member 6c form a structure to press the hinge member 7 and the document cover 6 into contact with each other in accordance with the present invention.

The biasing member 7c pushes the document cover 6 in an arrow a direction in FIG. 5 thereby shifts the backlash such that the positional relation between the document cover 6 and the hinge member 7 in an axial direction of the rotational axis therebetween is constant.

By the biasing member 7c, the backlash in the rotation axial direction between the document cover 6 and the hinge member 7 is shifted and the looseness is prevented. Especially when the apparatus is set upright, the original is prevented from easily moving, and the function of fixing the original is fully performed.

Further, a suction cup (not shown) is attached to a front end of the document cover 6. Further, the surface of the apparatus main body 1 opposite to the suction cup has a suction-assisting smooth finish. Note that the sponge of the document press-fixing sheet 8 has a thickness such that the sponge is slightly depressed in a state where the document cover 6 is closed and the suction cup is in intimate contact with the apparatus main body 1.

In the above structure, in a state where the image reading apparatus is set in level, when the document cover 6 is opened, the document cover 6 is press-fixed to the hinge member 7 by the contact between the biasing member 7c of the hinge member 7 and the receive member 6c of the document cover 6. Accordingly, the document cover 6 does not rotate with respect to the hinge member 7 about the rotational axis between the engagement portions of the concave portions 6a and the convex portions 7b, and the document cover 6 and the hinge member 7 integrally rotate only about the rotational axis between the engagement portions of the concave portions 1a and the convex portions 7a.

Figure 6:
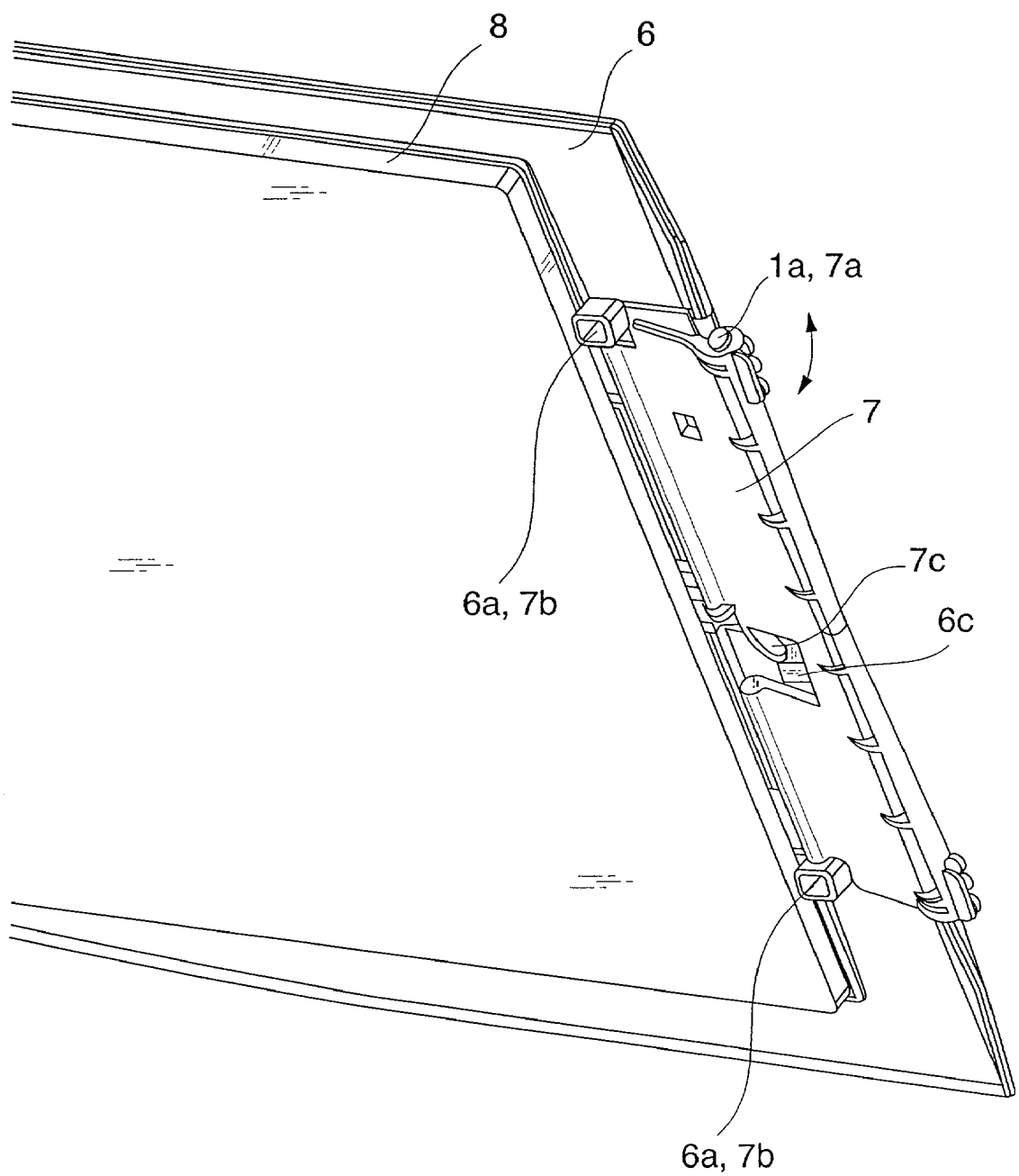
FIG. 6 is a partial perspective view of the connecting portion between the document cover and the hinge member according to the first embodiment when reading a thick original.

Next, a case where a thick original such as a book is set will be described. FIG. 6 is a perspective view of the document cover 6 and the hinge member 7 viewed from the platen glass 2 side. When the thick original is set and the document cover 6 is closed, the biasing member 7c integrally formed with the hinge member 7 moves away from the receive member 6c formed on the document cover 6, as shown in FIG. 6. Thus the press-fixed state between the hinge member 7 and the document cover 6 is released. Then the document cover 6 is folded along the rotational axis between the engagement portions of the concave portions 6a of the document cover 6 and the convex portions 7b of the hinge member 7, and the document press-fixing sheet 8 of the document cover 6 presses the original.

On the other hand, when a thin original is set and the document cover 6 is closed, the biasing member 7c of the hinge member 7 and the receive member 6c of the document cover 6 are brought into contact with each other, as shown in FIG. 5. The hinge member 7 and the document cover 6 are pressed into contact with each other, and these members integrally rotate only about the rotational axis between the engagement portions of the concave portions 1a and the convex portions 7a. Accordingly, the document press-fixing sheet 8 is brought into intimate contact with the original, and even though the original is thin, it can be securely fixed on the platen glass 2.

Further, in a case where the image reading apparatus is set upright, an original is set on the platen glass 2, the document cover 6 is closed and the suction cup is pressed from the outside. Then the suction cup is brought into intimate contact with the apparatus main body 1. At this time, as the sponge of the document press-fixing sheet 8 is depressed, the reaction from the sponge is applied on the original via the sheet member, thereby cockles and/or curled portions of the original are flattened, and the original is brought into intimate contact with the platen glass 2.

At this time, as the apparatus is set upright, the document cover 6 easily buckles about the rotational axis between the engagement portions of the concave portions 6a and the convex portions 7b without the biasing member 7c and the receive member 6c. However, in the present embodiment, as the biasing member 7c integrally formed with the hinge member 7 and the receive member 6c formed on the document cover 6 are brought into contact with each other and the document cover 6 is fixed while it is pressed against the hinge member 7, the document cover 6 does not buckle but maintains its position integral with the hinge member 7. Accordingly, the document cover 6 securely presses the original, and a sharp image can be read.

Further, as the biasing force of the biasing member 7c acts in the axial direction of the rotational axis, the backlash between the document cover 6 and the hinge member 7 is eliminated. Accordingly, the positional relation between the apparatus main body 1 and the document cover 6 when the document cover 6 is closed is constant, and looseness can be prevented. Especially when the apparatus is set upright, the original is prevented from easily moving, and the function of fixing the original can be fully performed.

<Second Embodiment>

Figure 7:
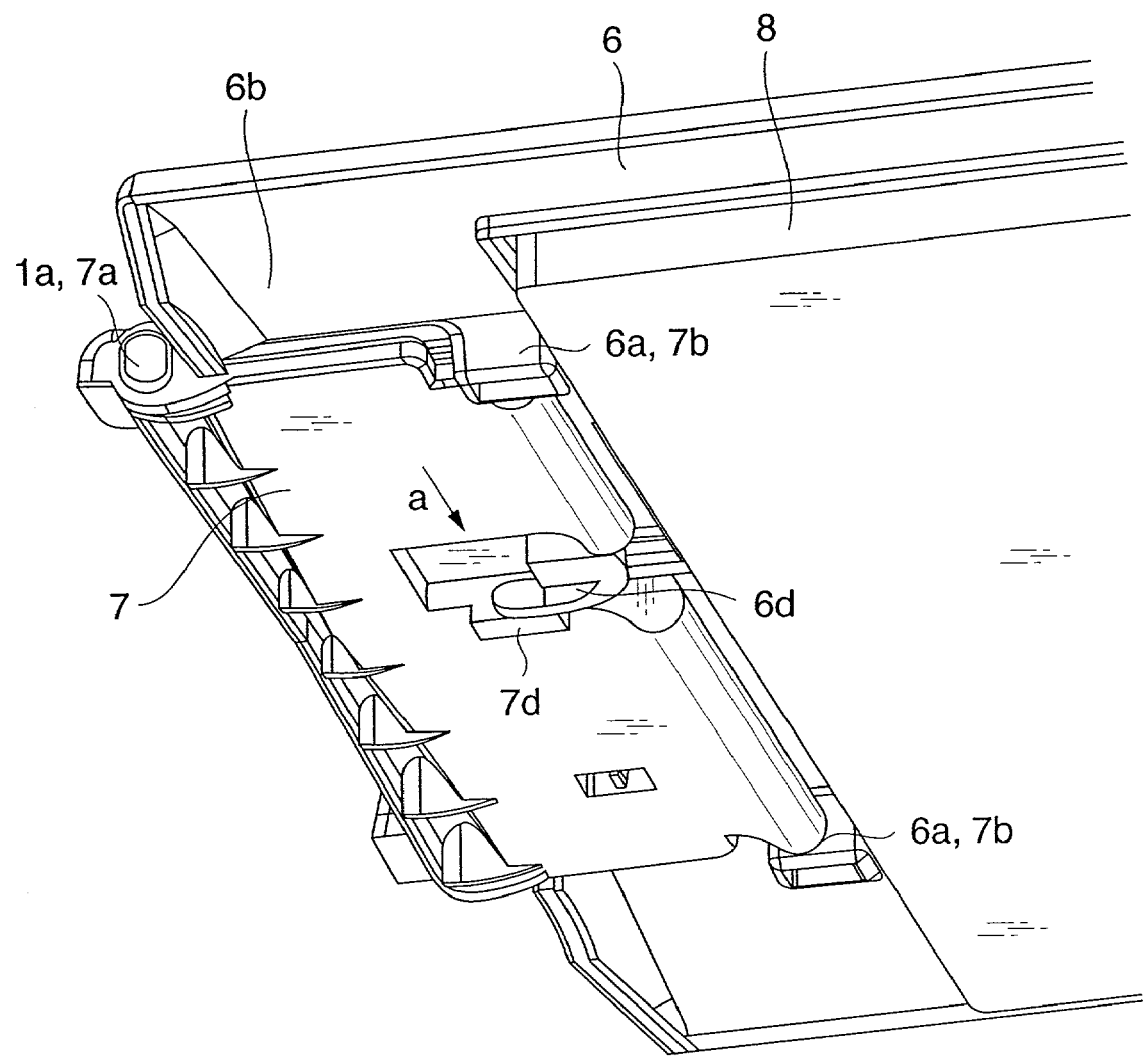
FIG. 7 is a partial perspective view of a connecting portion between the document cover and a hinge member according to a second embodiment of the present invention.
Figure 8:
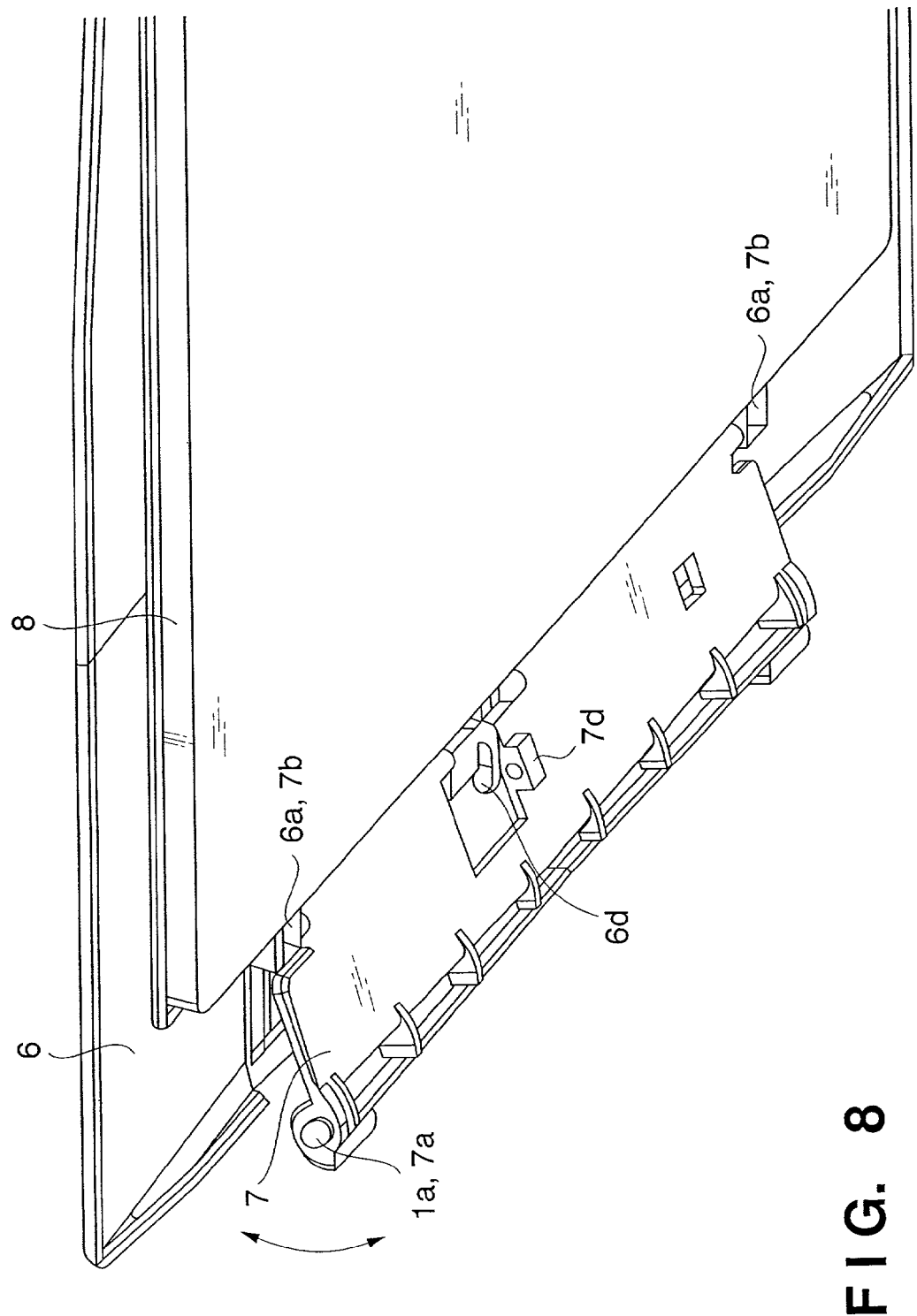
FIG. 8 is a partial perspective view of the connecting portion between the document cover and the hinge member according to the second embodiment when reading a thick original.

FIGS. 7 and 8 show the document cover 6 and the structure of the hinge member 7 according to a second embodiment. In the above-described first embodiment, the biasing member 7c is integrally formed with the hinge member 7 and the receive member 6c is formed on the document cover 6, however, in the second embodiment, a biasing member 6d is integrally formed with the document cover 6, and a receive member 7d is formed in the hinge member 7.

Since other constituent elements and operations are the same as those of the first embodiment, the same constituents have the same reference numerals and the explanations of the constituent elements will be omitted.

FIG. 7 is a partial perspective view of the document cover 6 and the hinge member 7 viewed from the platen glass 2 side. The biasing member 6d having elasticity is integrally formed with the document cover 6. The end of the biasing member 6 is in contact with the receive member 7d formed in the hinge member 7. The biasing member 6d and the receive member 7d form a structure to press the hinge member 7 and the document cover 6 into contact with each other in accordance with the present invention.

The biasing member 6d pushes the hinge member 7 in an arrow a direction in FIG. 7 to move the document cover 6 in a direction opposite to the arrow a thereby shifts the backlash such that the positional relation between the document cover 6 and the hinge member 7 in the axial direction of the rotational axis therebetween is stable.

By the biasing member 6d, the backlash in the rotation axial direction between the document cover 6 and the hinge member 7 is shifted and the looseness is prevented. Especially when the apparatus is set upright, the original is prevented from easily moving, and the function of fixing the original is fully performed.

In the above structure, in a state where the image reading apparatus is set in level, when the document cover 6 is opened, the document cover 6 is press-fixed to the hinge member 7 by the contact between the biasing member 6d of the document cover 6 and the receive member 7d of the hinge member 7. Accordingly, the document cover 6 does not rotate with respect to the hinge member 7 about the rotational axis between the engagement portions of the concave portions 6a and the convex portions 7b, and the document cover 6 and the hinge member 7 integrally rotate only about the rotational axis between the engagement portions of the concave portions 1a and the convex portions 7a.

Next, a case where a thick original such as a book is set will be described. FIG. 8 is a perspective view of the document cover 6 and the hinge member 7 viewed from the platen glass 2 side. When the thick original is set and the document cover 6 is closed, the biasing member 6d integrally formed with the document cover 6 moves away from the receive member 7d formed on the hinge member 7, as shown in FIG. 8. Thus the press-fixed state between the hinge member 7 and the document cover 6 is released. Then the document cover 6 is folded along the rotational axis between the engagement portions of the concave portions 6a of the document cover 6 and the convex portions 7b of the hinge member 7, and the document press-fixing sheet 8 of the document cover 6 presses the original.

On the other hand, when a thin original is set and the document cover 6 is closed, the biasing member 6d of the document cover 6 and the receive member 7d of the hinge member 7 are brought into contact with each other, as shown in FIG. 7. The hinge member 7 and the document cover 6 are pressed into contact with each other, and these members integrally rotate only about the rotational axis between the engagement portions of the concave portions 1a and the convex portions 7a. Accordingly, the document press-fixing sheet 8 is brought into intimate contact with the original, and even though the original is thin, it can be securely fixed on the platen glass 2.

Further, in a case where the image reading apparatus is set upright, an original is set on the platen glass 2, the document cover 6 is closed and the suction cup is pressed from the outside. Then the suction cup is brought into intimate contact with the apparatus main body 1. At this time, as the sponge of the document press-fixing sheet 8 is depressed, the reaction from the sponge is applied on the original via the sheet member, thereby cockles and/or curled portions of the original are flattened, and the original is brought into intimate contact with the platen glass 2.

At this time, as the apparatus is set upright, the document cover 6 easily buckles about the rotational axis between the engagement portions of the concave portions 6a and the convex portions 7b without the biasing member 6d and the receive member 7d. However, in the present embodiment, as the biasing member 6d integrally formed with the document cover 6 and the receive member 7d formed on the hinge member 7 are brought into contact with each other and the document cover 6 is fixed while it is pressed against the hinge member 7, the document cover 6 does not buckle but maintains its position integral with the hinge member 7. Accordingly, the document cover 6 securely presses the original, and a sharp image can be read.

Further, as the biasing force of the biasing member 6d acts in the axial direction of the rotational axis, the backlash between the document cover 6 and the hinge member 7 is eliminated. Accordingly, the positional relation between the apparatus main body 1 and the document cover 6 when the document cover 6 is closed is constant, and looseness can be prevented. Especially when the apparatus is set upright, the original is prevented from easily moving, and the function of fixing the original can be fully performed.

<Third Embodiment>

Figure 9:
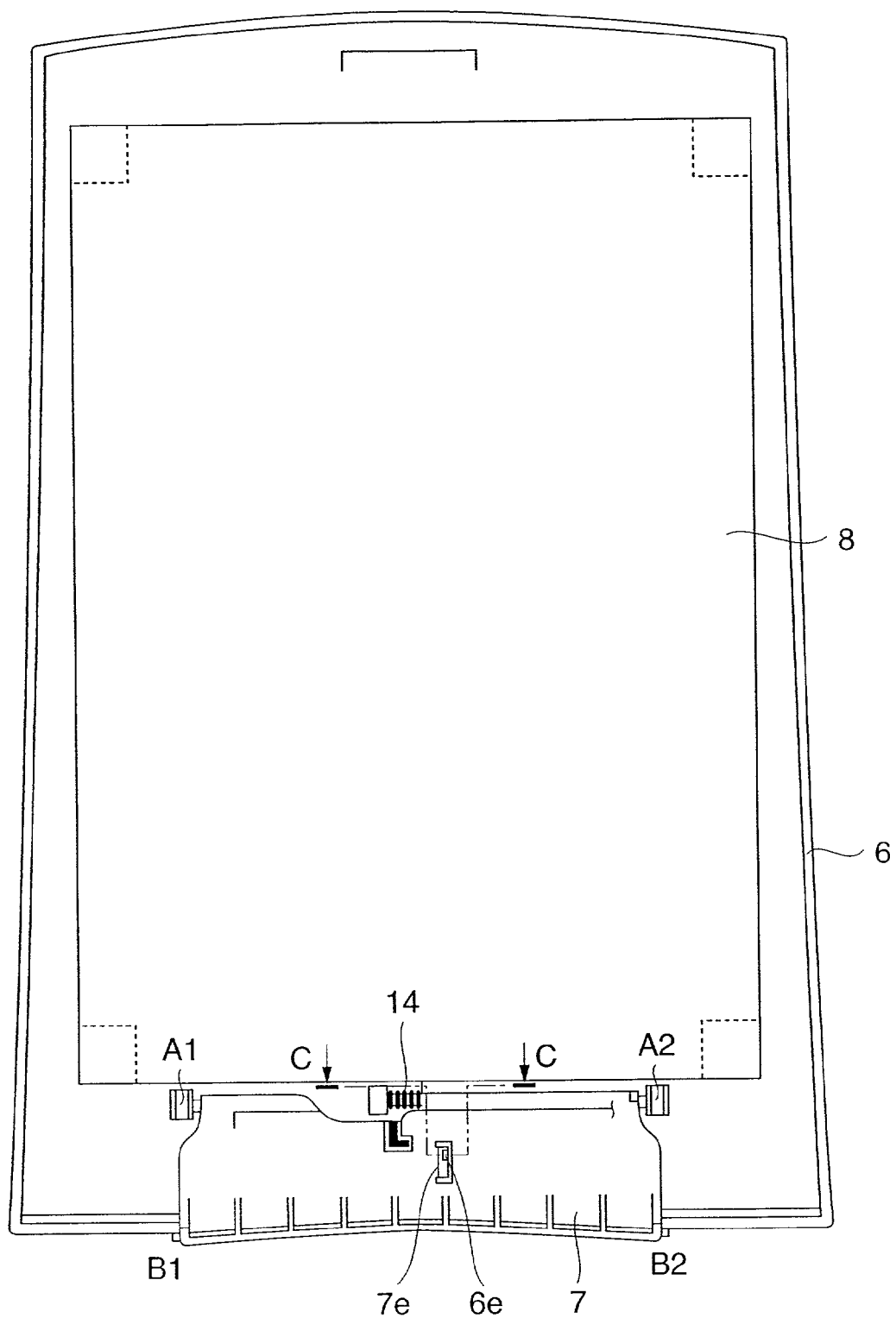
FIG. 9 is a schematic view showing the document cover and a hinge member according to a third embodiment of the present invention.

FIGS. 9 and 10 show the document cover 6 and the structure of the hinge member 7 according to a third embodiment. In the third embodiment, a convex portion 6e of the document cover 6 and a hole 7e of the hinge member 7 form a connection structure, and a screw coil spring 14 is provided.

Since other constituent elements and operations are the same as those of the first embodiment, the same constituent elements have the same reference numerals, and the explanations of the constituent elements will be omitted.

The document cover 6 according to the third embodiment as shown in FIG. 9 has the document press-fixing sheet 8 comprising a sheet material and a sponge to press an original against the platen glass 2. The document cover 6 further has the hinge member 7 attached to the document cover 6 rotatably about rotational axis A1–A2, and the screw coil spring 14 having a function of eliminating the backlash between the document cover 6 and the hinge member 7 in a thrust direction (axial direction) and a function of rotating the document cover 6 in an opening direction with respect to the hinge member 7 (a direction where the document cover is integral with the hinge member) about the rotational axis A1–A2.

Further, the document cover 6 is provided with the convex portion 6e and the hinge member 7 is provided with the hole 7e having a groove 7f, as a connection structure, a releasable hook structure, which enables the document cover 6 and the hinge member operates integrally upon opening/closing.

The document cover 6 is attached to the image reading apparatus via the hinge member 7 rotatably about rotational axis B1–B2.

Next, the third embodiment will be described in detail with reference to FIGS. 10A to 10F.

Figure 10B:
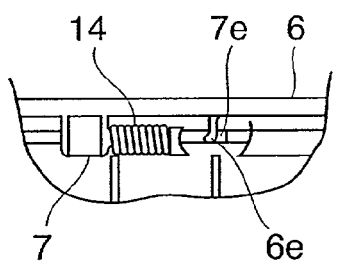
FIGS. 10A to 10F are schematic cross-sectional views and partial schematic views explaining the hinge structure openably/closably connecting the document cover to the apparatus main body according to the third embodiment.
Figure 10A:
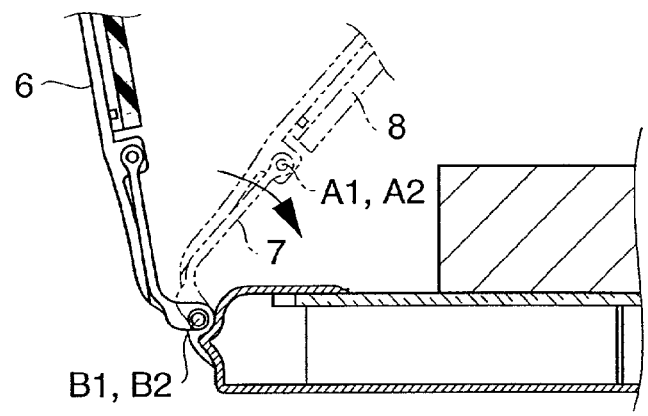
Figure 10D:
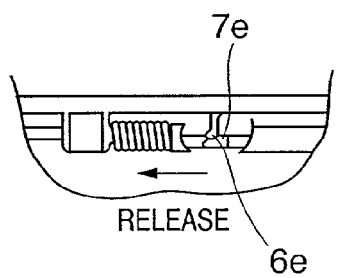
Figure 10C:
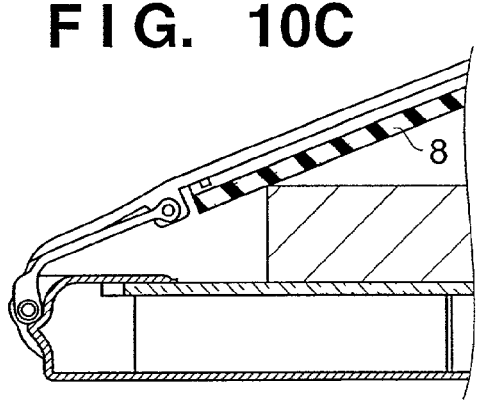
Figure 10F:
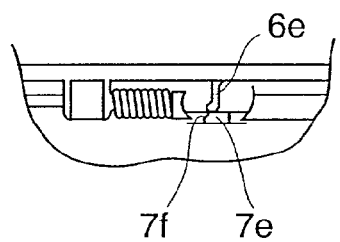
Figure 10E:
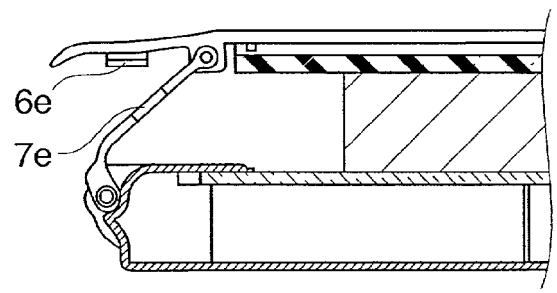
Figure 11:
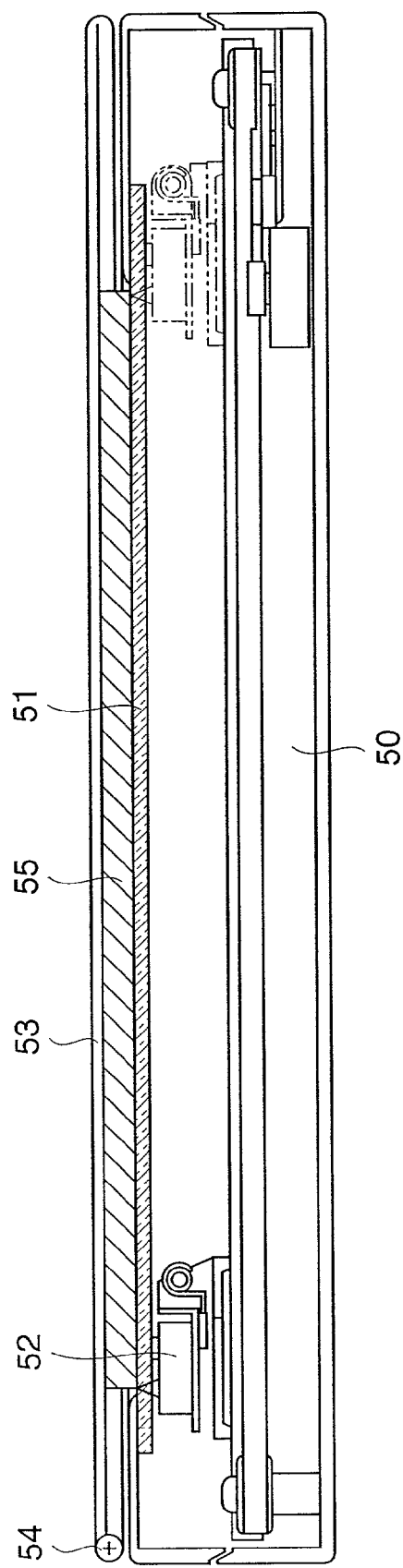
FIG. 11 is a cross-sectional view schematically showing the structure of the conventional image reading apparatus.
Figure 13:
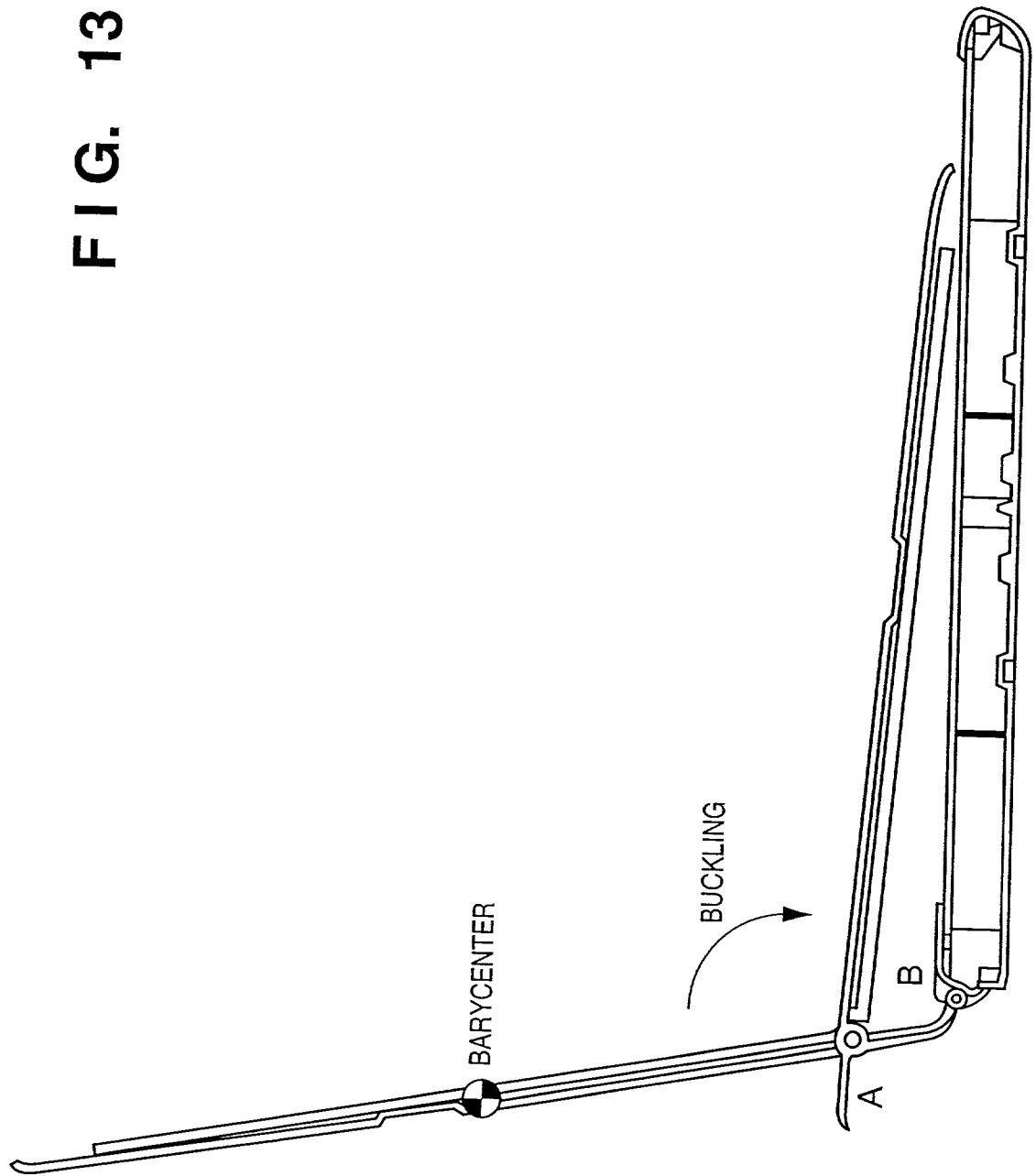
FIG. 13 is a cross-sectional view showing a state where buckling occurs in the conventional image reading apparatus.

As shown in FIG. 10E, the convex portion 6e is formed on the document cover 6, and the hole 7e with the groove 7f engaged with the convex portion 6e is formed in the hinge member 7. The end of the convex portion 6e has a small projection such that the end of the convex portion 6e engages with the groove 7f of the hole 7e. More specifically, the groove 7f of the hole 7e and the end of the small projection of the convex portion 6e have an R shape (round cross section) to be described later in the operation in setting a thick original.

In a state where the image reading apparatus according to the third embodiment is set in level, when a sheet of original is set on the platen glass 2 and the document cover 6 is closed, as the convex portion 6e of the document cover 6 and the groove 7f of the hole 7e of the hinge member 7 are engaged with each other, the document cover 6 and the hinge member 7 do not buckle but operate integrally with each other.

Accordingly, the original is not damaged by buckling of the document cover 6 and the hinge member 7. Further, by virtue of the function of the screw coil spring 14, the document cover 6 can securely press the original in a predetermined position in a stable manner without looseness between the document cover 6 and the hinge member 7. Accordingly, image information of the original can be read without influence of extraneous light.

Next, when a thick original such as a book is set and the document cover 6 is closed, the document cover 6 is folded downward about the rotational axis between the document cover 6 and the hinge member 7, into a position to cover the original, as shown in FIGS. 10A, 10C and 10E.

The operations of the convex portion 6e of the document cover 6 and the groove 7f of the hole 7e of the hinge member 7 at this time are as shown in FIGS. 10B, 10D and 10F which are cross-sectional views along a line C—C in FIG. 9. If the document press-fixing sheet 8 is brought into contact with the thick original as shown in FIG. 10C and the document cover 6 is pressed against the original. Further pressing force is changed into a force to move the hinge member 7 in a thrust direction (axial direction) by the R shape of the end of the convex portion 6e and the groove 7f of the hole 7e. Then the hinge member 7 moves in the thrust direction relatively to the document cover 6, and the engagement between the convex portion 6e and the groove 7f of the hole 7e is released. That is, the R shape of the end of the convex portion 6e and the groove 7f of the hole 7e work as a conversion mechanism to convert the rotational force between the hinge member 7 and the document cover 6 into the thrust-directional biasing force.

On the other hand, when the document cover 6 is opened from this state, the conversion mechanism similarly changes the own weight of the document cover 6 into the thrust force. The convex portion 6e is engaged with the groove 7f of the hole 7e, and the document cover 6 and the hinge member 7 become integral with each other.

Accordingly, the two-step hinge and smooth opening/closing operations are realized, and the damage to original due to buckling can be prevented.

Similarly, when the apparatus is set upright, by virtue of the function of the screw coil spring 14, the document cover 6 presses the original in a predetermined position. Further, as the convex portion 6e of the document cover 6 and the groove 7f of the hole 7e of the hinge member 7 are engaged with each other and the hinge member 7 and the document cover 6 are integral with each other, smooth opening/closing operations can be made without buckling.

Further, when the apparatus is set upright, as force due to the own weight of hinge member 7 and the document cover 6 acts in a direction parallel to the rotational axis A1–A2. Accordingly, the force for limiting the rotation does not act on the document cover 6 and the document cover 6 tends to open easier than a case where the apparatus is set in level. However, the document cover 6 and the hinge member 7 are integral with each other and maintain the opened position by the operation of biasing force of the screw coil spring 14 to push the document cover 6 to be integral with the hinge member 7.

Accordingly, the document cover 6 does not float from the platen glass 2 due to buckling about the rotational axis A1–A2 but securely presses an original. Thus a sharp image can be read.

As described above, according to the present invention, even if a thick original is to be read or if the apparatus is set upright, the original can be securely fixed and a sharp image can be read with a simple structure. Further, backlash between an original pressing member and a hinge member can be prevented, thereby the original can be prevented from easily moving. Thus the function of fixing the original can be fully performed.

Accordingly, the present invention can provide a space-saving image reading apparatus which obtains a high-quality image.

Note that in the above embodiments, the present invention is applied to an image reading apparatus, however, this does not pose any limitation on the present invention. The present invention is applicable to various apparatuses having an original reading structure such as a copier, a facsimile machine and a combination copier/facsimile apparatus.

Further, in a case where the present invention is applied to an apparatus which is not set upright, as buckling of document cover is prevented, inadvertent damage to original can be prevented.

The present invention is not limited to the above embodiments and various changes and modifications can be made within the spirit and scope of the present invention. Therefore, to appraise the public of the scope of the present invention, the following claims are made.

What is claimed is:

1. An original pressing apparatus comprising:
   an original pressing plate;
   a hinge unit having a first end supported rotatably with respect to said original pressing plate by a first axis and a second end rotatably supported with respect to an external device by a second axis which is parallel with said first axis; and
   a press-fixing unit adapted to prevent rotation between said hinge unit and said original pressing plate, wherein said press-fixing unit comprises an elastic member to apply a biasing force to said original pressing plate and said hinge unit in an axial direction parallel with said first and second axes, wherein said press-fixing unit is capable of releasing a press-contact state.

2. The original pressing apparatus according to claim 1, wherein said elastic member comprises a biasing member integrally formed with said original pressing plate, adapted to push said hinge unit in the axial direction of an axis rotatably supporting said hinge unit; and said press-fixing unit further comprises a receive member integrally formed with said hinge unit.

3. The original pressing apparatus according to claim 1, wherein said elastic member comprises a biasing member integrally formed with said hinge unit, adapted to push said original pressing plate in the axial direction of an axis rotatably supporting said original pressing plate; and said press-fixing unit further comprises a receive member integrally formed with said original pressing plate.

4. The original pressing apparatus according to claim 1, wherein said elastic member further applies the biasing force in a direction to bring said original pressing plate and said hinge unit to be integral with other.

5. The original pressing apparatus according to claim 4, wherein said elastic member is a screw coil spring.

6. The original pressing apparatus according to claim 4, further comprising a conversion unit adapted to convert the biasing force to bring said original pressing plate and said hinge unit to be integral with each other into the biasing force in the axial direction.

7. The original pressing apparatus according to claim 6, wherein said conversion unit has:
   a concave portion formed in said hinge unit; and
   a convex portion integrally formed with said original pressing plate, engageable with said concave portion and releasable from engagement with said concave portion, having a projection-shaped end on the side to come into contact with said concave portion, and wherein said conversion unit performs conversion by contact between said projection-shaped end and said concave portion and thrust of said projection-shaped end on said concave portion.

8. The original pressing apparatus according to claim 1, wherein said original pressing plate has a limitation member to limit rotation with respect to said hinge unit, and said limitation member is coupled to said original pressing plate at a position adjacent to the first end of said hinge unit.

9. An original reading apparatus having:
   the original pressing apparatus in claim 1; and
   a reading unit adapted to read an original pressed by said original pressing apparatus.

10. A copying apparatus having:
    the original pressing apparatus in claim 1; and
    a copying unit adapted to copy an original pressed by said original pressing apparatus.

11. A facsimile apparatus having:
    the original pressing apparatus in claim 1;
    a reading unit adapted to read an original pressed by said original pressing apparatus; and
    a communication unit.

12. A complex apparatus having:
    the original pressing apparatus in claim 1;
    a reading unit adapted to read an original pressed by said original pressing apparatus;
    a printing unit; and
    a communication unit.

* * * * *